(12) United States Patent
Wang et al.

(10) Patent No.: US 11,259,384 B2
(45) Date of Patent: Feb. 22, 2022

(54) BACKLIGHT UNIT AND CONTROL METHOD THEREOF, AND LIQUID CRYSTAL DISPLAY DEVICE

(71) Applicant: TCL CHINA STAR OPTOELECTRONICS TECHNOLOGY CO., LTD., Guangdong (CN)

(72) Inventors: Fuyi Wang, Guangdong (CN); Mingjong Jou, Guangdong (CN); Zhao Wang, Guangdong (CN); Fengcheng Xu, Guangdong (CN); Jinfeng Liu, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 18 days.

(21) Appl. No.: 16/769,863

(22) PCT Filed: May 9, 2020

(86) PCT No.: PCT/CN2020/089377
§ 371 (c)(1),
(2) Date: Jun. 4, 2020

(65) Prior Publication Data
US 2021/0337642 A1     Oct. 28, 2021

(51) Int. Cl.
*G09G 3/00* (2006.01)
*G02F 1/13* (2006.01)
*H05B 45/10* (2020.01)
*H05B 45/44* (2020.01)
(Continued)

(52) U.S. Cl.
CPC .......... *H05B 45/44* (2020.01); *G02F 1/1336* (2013.01); *H05B 45/10* (2020.01); *G02F 1/133601* (2021.01)

(58) Field of Classification Search
None
See application file for complete search history.

(56) References Cited

U.S. PATENT DOCUMENTS 9,412,301 B2   8/2016  In et al.
2011/0285611 A1*  11/2011  Asano ................ G09G 3/3426
                                                   345/87
(Continued)

FOREIGN PATENT DOCUMENTS

CN   202058415 U   11/2011
CN   106097966 A   11/2016
(Continued)

*Primary Examiner* — Dedei K Hammond
(74) *Attorney, Agent, or Firm* — The Roy Gross Law Firm LLC; Roy Gross

(57) ABSTRACT

The present invention provides a backlight unit and a control method thereof, and a liquid crystal display device. The control method includes steps as follows: obtaining backlight data corresponding to each partition, wherein the backlight data comprises a plurality of bits of data; dividing the light-emitting unit of each partition into a plurality of subfields with different durations in a light-emitting process during a frame, wherein each subfield corresponds to one bit of data, and any two subfields comprise different numbers of secondary subfields; and outputting the plurality of subfields in a preset order.

16 Claims, 5 Drawing Sheets

--- obtaining backlight data corresponding to each partition, wherein the backlight data comprises a plurality of bits of data — S101 dividing the light-emitting unit of each partition into a plurality of subfields with different durations in a light-emitting process during a frame, wherein each subfield corresponds one bit of data, and any two subfields comprise different numbers of secondary subfields — S102 outputting the plurality of subfields in a preset order — S103

(51) Int. Cl.
    *G02F 1/13357*    (2006.01)
    *G02F 1/1335*     (2006.01)

(56) References Cited

U.S. PATENT DOCUMENTS

2015/0235620 A1*   8/2015   Takahota ............. G09G 3/3696
                                                            345/690
2018/0190186 A1    7/2018   Chen
2018/0197479 A1    7/2018   Chen

FOREIGN PATENT DOCUMENTS

CN        106097972 A     11/2016
CN        110517630 A     11/2019

\* cited by examiner

BACKLIGHT UNIT AND CONTROL METHOD THEREOF, AND LIQUID CRYSTAL DISPLAY DEVICE

FIELD OF INVENTION

The present disclosure relates to the field of display technology, and more particularly, to a backlight unit and a control method thereof, and a liquid crystal display device.

BACKGROUND OF INVENTION

With vigorous development of information society, people's demand for information display has become increasingly urgent and extensive, and requirements are increasingly stringent. Display technology of panel industry has developed rapidly since the 1990s and gradually matured. Due to advantages of high definition, good image color, power saving, lightweight and thinness, portability, etc., flat panel displays have been widely used in the above information display products and have broad market prospects. As driving technology of the panel industry matures, opportunities and challenges will follow. Due to limitations of backlight of liquid crystal display devices, such as high power consumption and low contrast, the backlight is forced to develop in a direction of local dimming.

Traditional sub-millimeter light-emitting diode (mini LED) backlights adopt a static driving scheme or a passive matrix (PM) driving scheme to realize local backlight control. Since each region needs to be controlled by a data line, a number of backlight partitions is generally less than 2000 partitions and too many driver chips are required, resulting in high product costs.

Therefore, only by finding cost-reducing technical solutions would there be an opportunity to see actual mass-produced products in the market.

SUMMARY OF INVENTION

A purpose of the present disclosure is to provide a backlight unit and a control method thereof, and a liquid crystal display device, to adjust brightness of the backlight unit by partition, and more accurately control brightness of each partition of the backlight unit simultaneously, so that a phenomenon of uneven brightness disappears.

For a control method of a backlight unit, the backlight unit comprises a plurality of partitions, each partition comprises a light-emitting unit, and the control method comprises a plurality of steps as follows: obtaining backlight data corresponding to each partition, wherein the backlight data comprises a plurality of bits of data; dividing the light-emitting unit of each partition into a plurality of subfields with different durations in a light-emitting process during a frame, wherein each subfield corresponds to one bit of data, and any two subfields comprise different numbers of secondary subfields; and outputting the plurality of subfields in a preset order.

In the above control method of the backlight unit, the step of dividing the light-emitting unit of each partition into the plurality of subfields with different durations in the light-emitting process during one frame comprises a plurality of steps as follows: dividing the light-emitting unit of each partition into Nth subfields with different durations in the light-emitting process during one frame, wherein an i-th subfield corresponds to an (i−1)th bit of data, a duration of the i-th subfield is $2^{i-1}$ equal-duration, the i-th subfield comprises $2^{i-1}$ secondary subfield, a duration of each secondary subfield is equal to the equal-duration, each equal-duration is equal to $M/2^N$, M is a duration of one frame, i is an integer greater than or equal to 1 and less than or equal to N, M is greater than 0, the backlight data comprises the bits of data from a 0th bit to an (N−1)th bit, and N is an integer greater than or equal to 2.

In the above control method of the backlight unit, the step of outputting the plurality of subfields in the preset order comprises a plurality of steps as follows: outputting the subfields from a 1st subfield to an Nth subfield in sequence, and output corresponding bit of data once during each secondary subfield of the i-th subfield, wherein the bits of data from the 0th bit to the (N−1)th bit are 0 or 1, when the (i−1)th bit of data is 1, the light-emitting unit is in a bright state for a duration corresponding to the i-th subfield; and when the (i−1)th bit of data is 0, the light-emitting unit is in a dark state for the duration corresponding to the i-th subfield.

In the above control method of the backlight unit, each light-emitting unit comprises a charging unit, a driving unit, an energy storage unit, and a plurality of light-emitting components connected in series. The charging unit, the driving unit, and the energy storage unit are electrically connected, thereby being configured to write a data signal into the energy storage unit according to a scanning signal. The driving unit, the energy storage unit, the charging unit, and the plurality of light-emitting components connected in series are electrically connected, thereby being configured to drive the plurality of light-emitting components connected in series to work under control of the energy storage unit. The energy storage unit is configured to store the data signal, and control a working state of the driving unit according to the data signal.

In the above control method of the backlight unit, the charging unit is a first thin film transistor, the driving unit is a second thin film transistor, the energy storage unit is a capacitor, and the plurality of light-emitting components connected in series comprises sub-millimeter light-emitting diodes. A gate of the first thin film transistor is connected to a scanning line, a first end of the first thin film transistor is connected to a data line, and a second end of the first thin film transistor is connected to a gate of the second thin film transistor. One end of the plurality of light-emitting components connected in series is connected to a first level end, and the other end of the plurality of light-emitting components connected in series is connected to a first end of the second thin film transistor. The gate of the second thin film transistor is connected to the second end of the first thin film transistor and a first end of the capacitor, the first end of the second thin film transistor is connected to the plurality of light-emitting components connected in series, and a second end of the second thin film transistor is connected to a second level end and a second end of the capacitor.

In the above control method of the backlight unit, the step of obtaining the backlight data corresponding to each partition comprises a plurality of steps as follows: obtaining the backlight data of each partition from a timing controller or a field editable array.

For a backlight unit, the backlight unit comprises a plurality of partitions, each partition comprises a light-emitting unit, and comprises an obtaining unit configured to obtain backlight data corresponding to each partition, wherein the backlight data comprises a plurality of bits of data; a dividing unit configured to divide the light-emitting unit of each partition into a plurality of subfields with different durations in a light-emitting process during a frame, wherein each subfield corresponds to one bit of data, and any two subfields comprise different numbers of secondary subfields; and an output unit configured to output the plurality of subfields in a preset order.

In the above backlight unit, the dividing unit is configured to divide the light-emitting unit of each partition into Nth subfields with different durations in the light-emitting process during one frame, an i-th subfield corresponds to an (i−1)th bit of data, a duration of the i-th subfield is $2^{i-1}$ equal-duration, the i-th subfield comprises $2^{i-1}$ secondary subfield, a duration of each secondary subfield is equal to the equal-duration, each equal-duration is equal to $M/2^N$, M is a duration of one frame, i is an integer greater than or equal to 1 and less than or equal to N, M is greater than 0, the backlight data comprises the bits of data from a 0th bit to an (N−1)th bit, and N is an integer greater than or equal to 2.

In the above backlight unit, the output unit is configured to output the subfields from a 1st subfield to an Nth subfield in sequence, and output corresponding bit of data once during each secondary subfield of the i-th subfield, wherein the bits of data from the 0th bit to the (N−1)th bit are 0 or 1, when the (i−1)th bit of data is 1, the light-emitting unit is in a bright state for a duration corresponding to the i-th subfield; and when the (i−1)th bit of data is 0, the light-emitting unit is in a dark state for the duration corresponding to the i-th subfield.

In the above backlight unit, each light-emitting unit comprises a charging unit, a driving unit, an energy storage unit, and a plurality of light-emitting components connected in series. The charging unit, the driving unit, and the energy storage unit are electrically connected, thereby being configured to write a data signal into the energy storage unit according to a scanning signal. The driving unit, the energy storage unit, the charging unit, and the plurality of light-emitting components connected in series are electrically connected, thereby being configured to drive the plurality of light-emitting components connected in series to work under control of the energy storage unit. The energy storage unit is configured to store the data signal, and control a working state of the driving unit according to the data signal.

In the above backlight unit, the charging unit is a first thin film transistor, the driving unit is a second thin film transistor, the energy storage unit is a capacitor, and the plurality of light-emitting components connected in series comprises sub-millimeter light-emitting diodes. A gate of the first thin film transistor is connected to a scanning line, a first end of the first thin film transistor is connected to a data line, and a second end of the first thin film transistor is connected to a gate of the second thin film transistor. One end of the plurality of light-emitting components connected in series is connected to a first level end, and the other end of the plurality of light-emitting components connected in series is connected to a first end of the second thin film transistor. The gate of the second thin film transistor is connected to the second end of the first thin film transistor and a first end of the capacitor, the first end of the second thin film transistor is connected to the plurality of light-emitting components connected in series, and a second end of the second thin film transistor is connected to a second level end and a second end of the capacitor.

For a liquid crystal display device, the liquid crystal display device comprises a backlight unit, the backlight unit comprises a plurality of partitions, each partition comprises a light-emitting unit, and comprises an obtaining unit configured to obtain backlight data corresponding to each partition, wherein the backlight data comprises a plurality of bits of data; a dividing unit configured to divide the light-emitting unit of each partition into a plurality of subfields with different durations in a light-emitting process during a frame, wherein each subfield corresponds to one bit of data, and any two subfields comprise different numbers of secondary subfields; and a output unit configured to output the plurality of subfields in a preset order.

In the above liquid crystal display device, the dividing unit is configured to divide the light-emitting unit of each partition into Nth subfields with different durations in the light-emitting process during one frame, an i-th subfield corresponds to an (i−1)th bit of data, a duration of the i-th subfield is $2^{i-1}$ equal-duration, the i-th subfield comprises $2^{i-1}$ secondary subfield, a duration of each secondary subfield is equal to the equal-duration, each equal-duration is equal to $M/2^N$, M is a duration of one frame, i is an integer greater than or equal to 1 and less than or equal to N, M is greater than 0, the backlight data comprises the bits of data from a 0th bit to an (N−1)th bit, and N is an integer greater than or equal to 2

In the above liquid crystal display device, the output unit is configured to output the subfields from a 1st subfield to an Nth subfield in sequence, and output corresponding bit of data once during each secondary subfield of the i-th subfield, wherein the bits of data from the 0th bit to the (N−1)th bit are 0 or 1, when the (i−1)th bit of data is 1, the light-emitting unit is in a bright state for a duration corresponding to the i-th subfield; and when the (i−1)th bit of data is 0, the light-emitting unit is in a dark state for the duration corresponding to the i-th subfield.

In the above liquid crystal display device, each light-emitting unit comprises a charging unit, a driving unit, an energy storage unit, and a plurality of light-emitting components connected in series. The charging unit, the driving unit, and the energy storage unit are electrically connected, thereby being configured to write a data signal into the energy storage unit according to a scanning signal. The driving unit, the energy storage unit, the charging unit, and the plurality of light-emitting components connected in series are electrically connected, thereby being configured to drive the plurality of light-emitting components connected in series to work under control of the energy storage unit. The energy storage unit is configured to store the data signal, and control a working state of the driving unit according to the data signal.

In the above liquid crystal display device, the charging unit is a first thin film transistor, the driving unit is a second thin film transistor, the energy storage unit is a capacitor, and the plurality of light-emitting components connected in series comprises sub-millimeter light-emitting diodes. A gate of the first thin film transistor is connected to a scanning line, a first end of the first thin film transistor is connected to a data line, and a second end of the first thin film transistor is connected to a gate of the second thin film transistor. One end of the plurality of light-emitting components connected in series is connected to a first level end, and the other end of the plurality of light-emitting components connected in series is connected to a first end of the second thin film transistor. The gate of the second thin film transistor is connected to the second end of the first thin film transistor and a first end of the capacitor, the first end of the second thin film transistor is connected to the plurality of light-emitting components connected in series, and a second end of the second thin film transistor is connected to a second level end and a second end of the capacitor.

The present disclosure provides a backlight unit and a control method thereof, and a liquid crystal display device. The control method comprises a plurality of steps as follows: obtaining backlight data corresponding to each partition, wherein the backlight data comprises a plurality of bits of data; dividing the light-emitting unit of each partition into a plurality of subfields with different durations in a light-emitting process during a frame, wherein each subfield corresponds to one bit of data, and any two subfields comprise different numbers of secondary subfields; and outputting the plurality of subfields in a preset order. Since the subfields are divided into the partitions to adjust brightness of backlight, different partitions of the backlight unit realize brightness display of different gray levels through cumulative effect of visual brightness in time, which reduces power consumption of the backlight unit and improves contrast of the liquid crystal display device during display. Moreover, any two subfields comprise different numbers of secondary subfields to increase the number of charging times the light-emitting unit of each partition charging in each secondary subfield, which accurately controls brightness of each partition of the backlight unit, so that a phenomenon of uneven brightness disappears.

DETAILED DESCRIPTION OF PREFERRED EMBODIMENTS

The technical solutions in the embodiments of the present disclosure will be clearly and completely described below in conjunction with accompanying drawings in the embodiments of the present disclosure. Obviously, the embodiments described are merely a part of the present disclosure, rather than all the embodiments. All other embodiments obtained by the person having ordinary skill in the art based on embodiments of the disclosure, without making creative efforts, are within the scope of the present disclosure.

Figure 1:
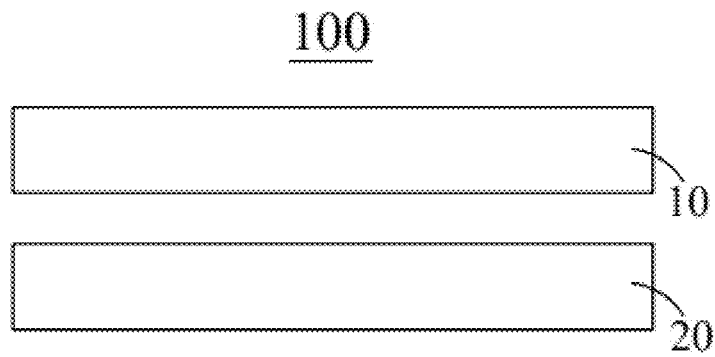
FIG. 1 is a schematic view of a liquid crystal display device of an embodiment of the present disclosure.

As shown in FIG. 1, FIG. 1 is a schematic view of a liquid crystal display device of an embodiment of the present disclosure. The liquid crystal display device 100 comprises a liquid crystal display panel 10 and a backlight unit 20. The liquid crystal display panel 10 is disposed opposite to the backlight unit 20. The backlight unit 20 is configured to emit light in partitions, and brightness of the light emitted by different partitions is independently controlled. The liquid crystal display panel 10 is configured to receive the light emitted from the different partitions of the backlight unit 20 and display images. The backlight unit 20 controls brightness of backlight partition light by a subfield segmentation method, which can reduce power consumption of the backlight unit 20 and increase contrast of the liquid crystal display panel 10 during display. Active matrix (AM) control method is configured to reduce control signals, thereby reducing cost.

Figure 2:
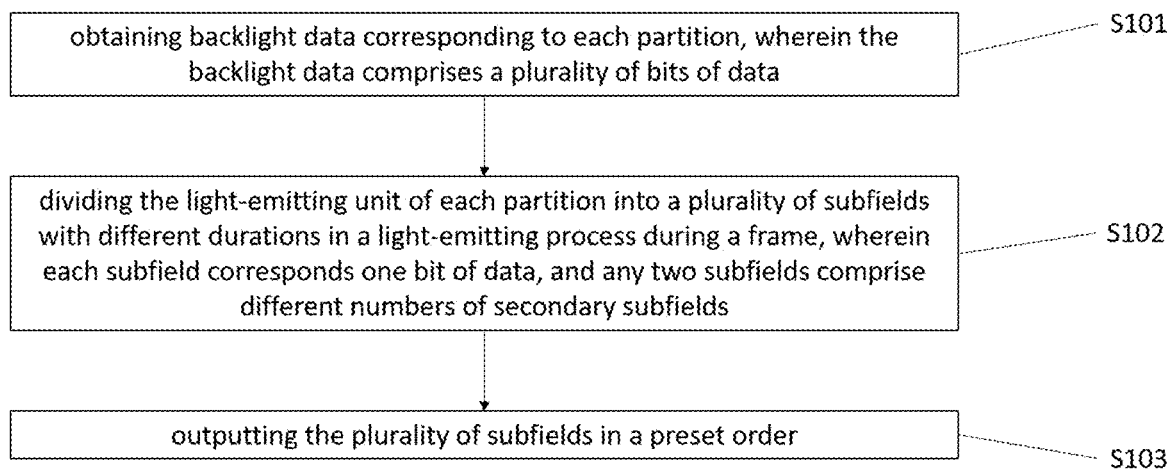
FIG. 2 is a flowchart of a control method of a backlight unit shown in FIG. 1.

As shown in FIG. 2, FIG. 2 is a flowchart of a control method of the backlight unit shown in FIG. 1. The backlight unit 20 comprises a plurality of partitions, and each partition comprises a light-emitting unit. The control method of the backlight unit comprises a plurality of steps as follows:

S101: obtaining backlight data corresponding to each partition. The backlight data comprises a plurality of bits of data.

Specifically, obtaining the backlight data of each partition from a time controller Tcon or a field programmable gate array FPGA. The backlight data of each partition is obtained by an algorithm process based on data information of images to be displayed. The backlight data comprises the bits of data from a 0th bit to an (N−1)th bit, and the bits of data from the 0th bit to the (N−1)th bit are 0 or 1. The 0th bit is the lowest bit, and the (N−1)th bit is the highest bit.

Each backlight unit 20 can emit light with different brightness. For example, when gray scale levels of the backlight unit 20 are 7 bits, the backlight unit 20 can emit 128 lights with different brightness, that is, the brightness corresponds to the gray scales ranging from 0 to 127; when the gray scale levels of the backlight unit 20 are 8 bits, the backlight unit 20 can emit 256 lights with different brightness; and when the gray scale levels of the backlight unit 20 are 10 bits, the backlight unit 20 can emit 1024 lights with different brightness.

One backlight unit 20 may consist of one backlight module, or may consist of a plurality of independently controlled backlight modules. Each backlight unit 20 comprises the plurality of partitions. A same number of inorganic light-emitting diodes connected in series is disposed in each partition. The inorganic light-emitting diodes are sub-millimeter light-emitting diodes (mini-LEDs). The inorganic light-emitting diodes comprise red inorganic light-emitting diodes comprises, blue inorganic light-emitting diodes comprises, and green inorganic light-emitting diodes comprises. The inorganic light-emitting diodes may further comprise white inorganic light-emitting diodes.

Each backlight unit 20 further comprises a plurality of parallel scanning lines and a plurality of parallel data lines, the scanning lines are insulated from the data lines and intersect perpendicularly. Each light-emitting unit 201 is connected to one scanning line and one data line, the light-emitting units 201 in a same row are connected to a same scanning line, and the light-emitting units 201 in a same column are connected to a same data line.

Figure 3:
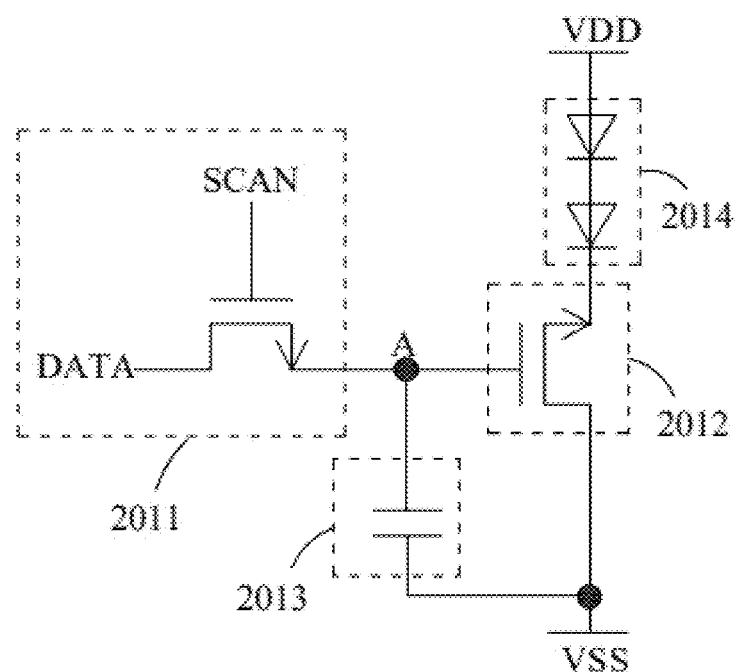
FIG. 3 is a schematic view of a light-emitting unit of the backlight unit of the embodiment of the present disclosure.

As shown in FIG. 3, FIG. 3 is a schematic view of the light-emitting unit of the backlight unit of the embodiment of the present disclosure. Each light-emitting unit 201 comprises a charging unit 2011, a driving unit 2012, an energy storage unit 2013, and a plurality of light-emitting components 2014 connected in series.

The charging unit 2011, the driving unit 2012, and the energy storage unit 2013 are electrically connected, thereby being configured to write a data signal into the energy storage unit 2013 according to a scanning signal.

The driving unit 2012, the energy storage unit 2013, and the plurality of light-emitting components 2014 connected in series are electrically connected, thereby being configured to drive the plurality of light-emitting components 2014 connected in series to work under control of the energy storage unit 2013.

The energy storage unit 2013 is configured to store the data signal, and control a working state of the driving unit 2012 according to the data signal.

The charging unit 2011 is a first thin film transistor, the driving unit 2012 is a second thin film transistor, the energy storage unit 2013 is a capacitor, and the plurality of light-emitting components 2014 connected in series comprise the sub-millimeter light-emitting diodes. A gate of the first thin film transistor is connected to a scanning line, a first end of the first thin film transistor is connected to a data line, and a second end of the first thin film transistor is connected to a gate of the second thin film transistor. The gate of the second thin film transistor is connected to the second end of the first thin film transistor and a first end of the capacitor, a first end of the second thin film transistor is connected to the plurality of light-emitting components 2014 connected in series, and a second end of the second thin film transistor is connected to a second level VSS end and a second end of the capacitor. One end of the plurality of light-emitting components 2014 connected in series is connected to a first level end VDD, the other end of the plurality of light-emitting components connected in series is connected to the first end of the second thin film transistor. The first level end VDD is configured to input a high-level direct current voltage, and the second level end VSS is a grounded end.

When a voltage corresponding to the data signal is greater than or equal to a turn-on voltage of the second thin film transistor, the second thin film transistor is turned on. Current flows through the plurality of light-emitting components 2014 connected in series, the plurality of light-emitting components 2014 connected in series emit light, and the light-emitting unit 201 is in a bright state. Due to a coupling effect of the capacitor, a potential of the gate of the second thin film transistor can be maintained for a period of time, and the time when the light-emitting unit 201 is in the bright state can also be maintained for a period of time. When the voltage corresponding to the data signal is less than the turn-on voltage of the second thin film transistor, the second thin film transistor is turned off, the plurality of light-emitting components 2014 connected in series are in an inoperative state, and the light-emitting unit 201 is in a dark state until the gate of the second thin film transistor receives a data signal greater than the turn-on voltage. However, due to a limited storage capacity of the capacitor, a potential of a node A (connected to the gate of the second thin film transistor) will decrease. A turn-on time of the first thin film transistor cannot meet an ideal situation (a duration of one subfield), so when durations of parts of subfields are longer, the light-emitting unit cannot be in the bright state all the time.

S102: dividing the light-emitting unit of each partition into a plurality of the subfields with different durations in a light-emitting process during a frame. Each subfield corresponds to one bit of data, and any two subfields comprise different numbers of secondary subfields.

Specifically, dividing the light-emitting unit of each partition into Nth subfield with different durations in the light-emitting process during one frame. An i-th subfield corresponds to an (i−1)th bit of data, a duration of the i-th subfield is $2^{i-1}$ equal-duration, the i-th subfield comprises $2^{i-1}$ secondary subfield, a duration of each secondary subfield is equal to the equal-duration, each equal-duration is equal to $M/2^N$, M is a duration of one frame, i is an integer greater than or equal to 1 and less than or equal to N, M is greater than 0, the backlight data comprises the bits of data from a 0th bit to an (N−1)th bit, and N is an integer greater than or equal to 2.

The number of subfields of the light-emitting unit 201 of each partition in one duration of one frame depends on the gray scale levels of the backlight unit 20. If the gray scale level of the backlight unit 20 is 7 levels, then the number of subfields is 7, and if the gray scale level of the backlight unit 20 is 8 levels, then the number of subfields is 8.

Durations of N subfields are different from each other, and each subfield corresponds to one bit of data. A 1st subfield comprises $2^0$ secondary subfields, a 2nd subfield comprises $2^1$ secondary subfields, a 3rd subfield comprises $2^2$ secondary subfields, a 4th subfield comprises $2^3$ secondary subfields, a 5th subfield comprises $2^4$ secondary subfields, a 6th subfield comprises $2^5$ secondary subfields, and a 7th subfield comprises $2^6$ secondary subfields. In each subfield, the scanning line of the backlight unit is scanned once from top to bottom, and the data signal is written to the light-emitting unit. Each secondary subfield outputs data corresponding bit corresponding to the subfield. When one subfield comprises a plurality of secondary subfields, the subfield will be scanned and charged a plurality of times; for example, in the 2nd subfield, it will be scanned and charged 2 times; in the 3rd subfield, it will be scanned and charged 4 times.

Since parts of subfields comprise the plurality of subfields, a charging time of the light-emitting unit 201 of the parts of subfields is increased, which prevents that the gray scale of the parts of partitions cannot be accurately controlled due to leakage of thin film transistors and an limited ability of a duration of the capacitor maintaining potentials.

S103: outputting the plurality of subfields in a preset order.

Specifically, output the subfields from the 1st subfield to the Nth subfield in sequence, and output corresponding bit of data once during each secondary subfield of the i-th subfield. The bits of data from the 0th bit to the (N−1)th bit are 0 or 1, when the (i−1)th bit of data is 1, the light-emitting unit is in a bright state for a duration corresponding to the i-th subfield; and when the (i−1)th bit of data is 0, the light-emitting unit is in a dark state for the duration corresponding to the i-th subfield.

The 1st subfield outputs a data of the bit corresponding to the 1st subfield. Two secondary subfields of the 2nd subfield output a data of the bit corresponding to the 2nd subfield. Four secondary subfields of the 3rd subfield output a data of the bit corresponding to the 3rd subfield. The $2^6$ secondary subfields of the seventh subfield output a data of the bit corresponding to the 7th subfield.

The control method of the above backlight unit will be described in detail below in conjunction with specific embodiments, and a 240 Hz, 7-bit gray-level backlight unit is taken as an example. Assuming that an entirety of backlight unit has 8 scanning lines, a 1G1D architecture is adopted (a row of the light-emitting units is connected to a same scanning line, and a column of the light-emitting units is connected to a same data line), and a scanning time of each scanning line is 32.5 us/8=3.8 us.

Figure 4:
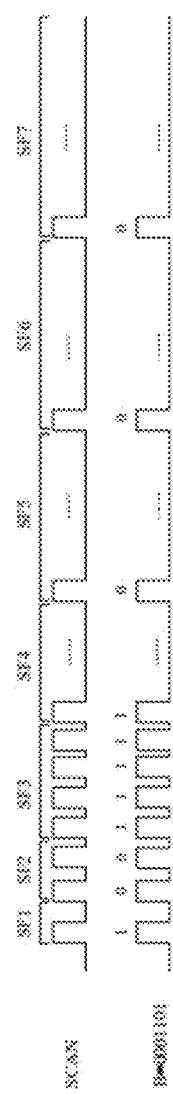
FIG. 4 is a schematic view illustrating a principle that the control method of the backlight unit of the embodiment of the present disclosure is applied in a partition whose backlight data is B=0001101.

As shown in FIG. 4, FIG. 4 is a schematic view illustrating a principle that the control method of the backlight unit of the embodiment of the present disclosure is applied in a partition whose backlight data is B=0001101. For one partition in the backlight unit 20, a front-end timing controller TCON or FPGA provides 7-bit data B=0001101, wherein 1 represents a data of the 0th bit B [0], 0 represents a data of a 1st bit B [1], 1 represents a data of a 2nd bit B [2], 1 represents a data of a 3rd bit B [3], 0 represents a data of a 4th bit B [4], and 0 represents a data of a 5th bit B [5], and 0 represents a data of a 6th bit B [6].

A time of each frame is 4.16 ms (1/240 seconds), which is divided into 7 parts. A duration of the first subfield SF1 is 32.5 us, which is configured to transmit the data 1 of the 0th bit B [0], a duration of the second subfield SF2 is twice the duration of the first subfield SF1, which is 65 us, and configured to transmit the data 0 of the 1st bit B [1]; a duration of the third subfield SF3 is twice the duration of the second subfield SF2, which is 130 us, and configured to transmit the data 1 of the 2nd bit B [2]; a duration of the fourth subfield SF4 is 260 us, which is configured to transmit the data 1 of the 3rd bit B [3]; a duration of the fifth subfield SF5 is 520 us, which is configured to transmit the data 0 of the 4th bit B [4]; a duration of the sixth subfield SF6 is 1.04 ms, which is configured to transmit the data 0 of the 5th bit B [5]; a duration of the seventh subfield SF7 is 2.08 ms, which is configured to transmit the data 0 of the 6th bit B [6].

After being processed by the control method of the backlight unit of the present disclosure, 7-bit data becomes 128-bit data. Wherein, the 0th bit B[0] is transformed to 1, the 1st bit B[1] is transformed to 00, the 2nd bit B[2] is transformed to 1111, the 3rd bit B[3] is transformed to 2 to the cube 1, the 4th bit B[4] is transformed to 2 to the fourth power 0, the 5th bit B[5] is transformed to 2 to the fifth power 0, the 6th bit B[6] is transformed to 2 to the sixth power 0. Adoption of such method, display times of different bits can indicate contribution of the different bits to brightness of the backlight, that is, weights of different bits are indicated.

For the first subfield SF1, 8 scanning lines in the backlight unit sequentially input scanning signals from top to bottom, and the light-emitting units in the backlight unit sequentially input data signals from top to bottom. In a partition where the backlight data B=0001101 needs to be output, each light-emitting unit is in a bright state, so that the first subfield SF1 outputs the data 1 of the 0th bit. Although a scanning charging time of each light-emitting unit 201 is only 3.8 microseconds, the capacitor in the light-emitting unit 201 can maintain a turn-on voltage at the node A for 30 microseconds, thereby maintaining the light-emitting unit 201 in the bright state at 32.5 us in the first subfield.

For the second subfield SF2, the scanning line in the backlight unit 20 sequentially inputs a first scanning signal from top to bottom, and the light-emitting unit 201 in the backlight unit 20 sequentially inputs the data signals for a first time from top to bottom. In the partition where the backlight data B=0001101 needs to be output, each light-emitting unit 201 is in the dark state, so that a first secondary subfield of the second subfield SF2 outputs the data 0 of the 1st bit. Then, the scanning line in the backlight unit 20 sequentially inputs a second scanning signal from top to bottom, and the light-emitting unit 201 in the backlight unit 20 sequentially inputs the data signals for a second time from top to bottom. In a partition where B=0001101 needs to be displayed, each light-emitting unit 201 continues to be in the dark state, so that a second secondary subfield of the second subfield SF2 outputs the data 0 of the 1st bit again, which realize two scanning charges of the second subfield SF2.

Hence, the 3rd subfield SF3 is scanned and charged for 2 squared times, the 4th subfield SF4 is scanned and charged for 2 cubed times, the 5th subfield SF5 is scanned and charged for 2 to the fourth power times, the 6th subfield SF6 is scanned and charged for 2 to the fifth power times, the 7th subfield SF7 is scanned and charged for 2 to the sixth power times. Backlight brightness display of one frame is completed through a cumulative effect of brightness of each subfield SF.

Figure 5:
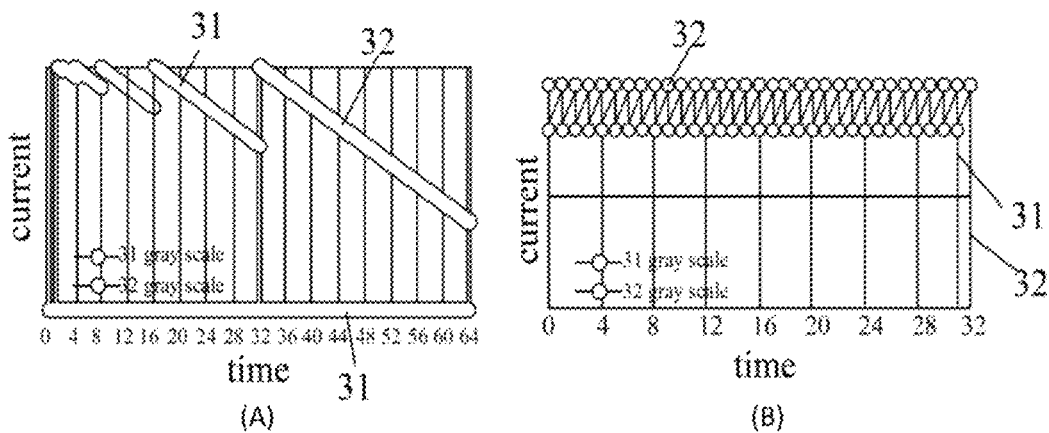
FIG. 5 is a time-current diagram of 31 gray scales and 32 gray scales under control of a traditional non-equimolecular field and a time-current diagram of the 31 gray scales and the 32 gray scales under the control method of the backlight unit of the embodiment of the present disclosure.
Figure 6:
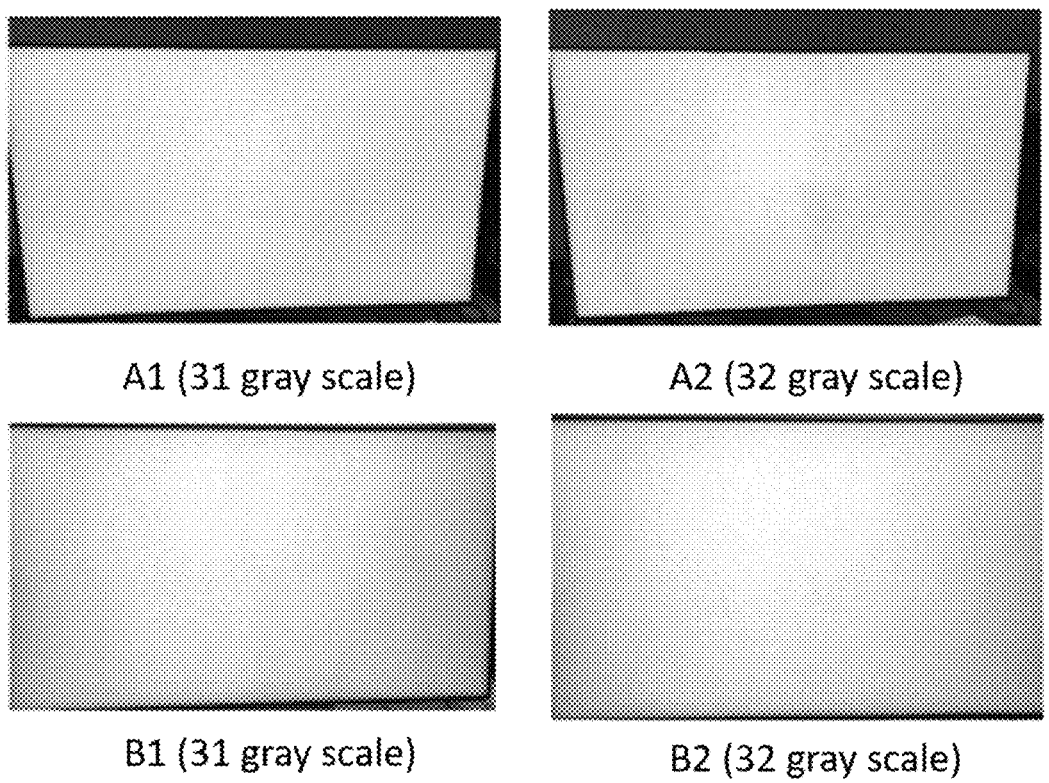
FIG. 6 is a schematic diagram of effects of the 31 gray scales and the 32 gray scales under the control of the traditional non-equimolecular field and a schematic diagram of effects of the 31 gray scales and the 32 gray scales under the control method of the backlight unit of the embodiment of the present disclosure.

As shown in FIG. 5, FIG. 5 is a time-current diagram of 31 gray scales and 32 gray scales under control of a traditional non-equimolecular field and a time-current diagram of the 31 gray scales and the 32 gray scales under the control method of the backlight unit of the embodiment of the present disclosure, wherein (A) is the time-current diagram of the 31 gray scales and the 32 gray scales under the control of the traditional non-equimolecular field, and (B) is the time-current diagram of the 31 gray scales and the 32 gray scales under the control method of the backlight unit of the embodiment of the present disclosure. As shown in FIG. 6, FIG. 6 is a schematic diagram of effects of the 31 gray scales and the 32 gray scales under the control of the traditional non-equimolecular field and a schematic diagram of effects of the 31 gray scales and the 32 gray scales under the control method of the backlight unit of the embodiment of the present disclosure, wherein A1 (31 gray scales) and A2 (32 gray scales) respectively are the schematic diagram of effects of the 31 gray scales and the 32 gray scales under the control of the traditional non-equimolecular field, and B1 (31 gray scales) and B2 (32 gray scales) respectively are the schematic diagram of effects of the 31 gray scales and the 32 gray scales under the control method of the backlight unit of the embodiment of the present disclosure.

Under a condition that the control method of the traditional non-equimolecular field and the number of the subfields of the backlight unit of the present disclosure are equal; for example, in 7 subfields, only one scanning charge occurs in each subfield and the scanning charging time is equal in the control method of the traditional non-equimolecular field; for example, all are 3.8 microseconds. However, the control method of the backlight unit in the embodiment of the present disclosure has different scanning charging times for any two subfields. As the above specific embodiment, a scanning charging time of the i-th subfield is $2^{i-1}$ time, and each scanning charging time is equal such as 3.8 microseconds. Under the control of the traditional non-equimolecular field, an average current value corresponding to the 32 gray scale from a 32nd equal-duration to a 64th equal-duration is less than an average current value from the 31 gray scale from a 0th equal-duration to a 31st equal-duration, which causes brightness of the 32 gray scale to be less than brightness of the 31 gray scale. A main reason is that the leakage of thin film transistors occurs in the light-emitting unit, and the capacitor has a limited time to maintain the potential. The brightness corresponding to the 32 gray scale is affected by the leakage of thin film transistors, current of the light-emitting components drops, and an entirety of the cumulative brightness of 32 gray scale is less than 31 gray scale. Under the control method of the backlight unit of the present disclosure, 31 a current value of the 31 gray scale corresponding to the 31st equal-duration is 0, and a current value of the 32 gray scale corresponding to the 32nd equal-duration is 0. Since the number of turn-on times of thin film transistors is increased, the current corresponding to the 32 gray scale is significantly weakened by the leakage of the thin film transistors, so that grayscale brightness of the backlight is accurately controlled, and a phenomenon of uneven brightness disappears.

Figure 7:
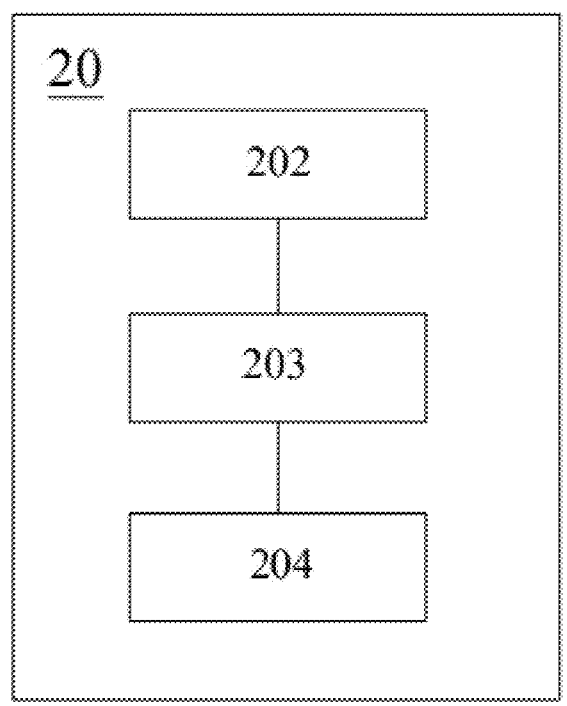
FIG. 7 is a schematic frame diagram of the backlight unit of the embodiment of the present disclosure.

The present disclosure further provides a backlight unit. FIG. 7 is a schematic frame diagram of the backlight unit of the embodiment of the present disclosure. The backlight unit 20 comprises an obtaining unit 202 configured to obtain backlight data corresponding to each partition, wherein the backlight data comprises a plurality of bits of data; a dividing unit 203 configured to divide the light-emitting unit of each partition into a plurality of subfields with different durations in a light-emitting process during a frame, wherein each subfield corresponds to one bit of data, and any two subfields comprise different numbers of secondary subfields; and an output unit 204 configured to output the plurality of subfields in a preset order.

In the present embodiment, the dividing unit 203 is configured to divide the light-emitting unit of each partition into Nth subfields with different durations in the light-emitting process during one frame, an i-th subfield corresponds to an (i−1)th bit of data, a duration of the i-th subfield is $2^{i-1}$ equal-duration, the i-th subfield comprises $2^{i-1}$ secondary subfield, a duration of each secondary subfield is equal to the equal-duration, each equal-duration is equal to $M/2^N$, M is a duration of one frame, i is an integer greater than or equal to 1 and less than or equal to N, M is greater than 0, the backlight data comprises the bits of data from a 0th bit to an (N−1)th bit, and N is an integer greater than or equal to 2.

In the present embodiment, the output unit 204 is configured to output the subfields from a 1st subfield to an Nth subfield in sequence, and output corresponding bit of data once during each secondary subfield of the i-th subfield, wherein the bits of data from the 0th bit to the (N−1)th bit are 0 or 1, when the (i−1)th bit of data is 1, the light-emitting unit is in a bright state for a duration corresponding to the i-th subfield; and when the (i−1)th bit of data is 0, the light-emitting unit is in a dark state for the duration corresponding to the i-th subfield.

In the present embodiment, each light-emitting unit comprises a charging unit, a driving unit, an energy storage unit, and a plurality of light-emitting components connected in series. The charging unit, the driving unit, and the energy storage unit are electrically connected, thereby being configured to write a data signal into the energy storage unit according to a scanning signal. The driving unit, the energy storage unit, the charging unit, and the plurality of light-emitting components connected in series are electrically connected, thereby being configured to drive the plurality of light-emitting components connected in series to work under control of the energy storage unit. The energy storage unit is configured to store the data signal, and control a working state of the driving unit according to the data signal.

The descriptions of the above embodiments are only used to help understand technical solutions of the present disclosure and core ideas thereof. Moreover, those of ordinary skill in the art should understand that the technical solutions described in the aforesaid embodiments can still be modified, or have some technical features equivalently replaced. However, these modifications or replacements do not depart from a scope of the technical solutions of the embodiments of the present disclosure.

What is claimed is:

1. A control method of a backlight unit, wherein the backlight unit comprises a plurality of partitions, each partition comprises a light-emitting unit, and the control method comprises steps as follows:
    obtaining backlight data corresponding to each partition, wherein the backlight data comprises a plurality of bits of data;
    dividing the light-emitting unit of each partition into a plurality of subfields with different durations in a light-emitting process during a frame, wherein each subfield corresponds to one bit of data, and any two subfields comprise different numbers of secondary subfields; and
    outputting the plurality of subfields in a preset order.

2. The control method of the backlight unit as claimed in claim 1, wherein the step of dividing the light-emitting unit of each partition into the plurality of subfields with different durations in the light-emitting process during one frame comprises steps as follows:
    dividing the light-emitting unit of each partition into Nth subfields with different durations in the light-emitting process during one frame, wherein an i-th subfield corresponds to an (i−1)th bit of data, a duration of the i-th subfield is 2i−1 equal-duration, the i-th subfield comprises 2i−1 secondary subfield, a duration of each secondary subfield is equal to the equal-duration, each equal-duration is equal to M/2N, M is a duration of one frame, i is an integer greater than or equal to 1 and less than or equal to N, M is greater than 0, the backlight data comprises the bits of data from a 0th bit to an (N−1)th bit, and N is an integer greater than or equal to 2.

3. The control method of the backlight unit as claimed in claim 2, wherein the step of outputting the plurality of subfields in the preset order comprises steps as follows:
    outputting the subfields from a 1st subfield to an Nth subfield in sequence, and outputting corresponding bit of data once during each secondary subfield of the i-th subfield;
    wherein the bits of data from the 0th bit to the (N−1)th bit are 0 or 1, when the (i−1)th bit of data is 1, the light-emitting unit is in a bright state for a duration corresponding to the i-th subfield; and
    when the (i−1)th bit of data is 0, the light-emitting unit is in a dark state for the duration corresponding to the i-th subfield.

4. The control method of the backlight unit as claimed in claim 1, wherein each light-emitting unit comprises a charging unit, a driving unit, an energy storage unit, and a plurality of light-emitting components connected in series;
    the charging unit, the driving unit, and the energy storage unit are electrically connected, thereby being configured to write a data signal into the energy storage unit according to a scanning signal;
    the driving unit, the energy storage unit, the charging unit, and the plurality of light-emitting components connected in series are electrically connected, thereby being configured to drive the plurality of light-emitting components connected in series to work under control of the energy storage unit; and
    the energy storage unit is configured to store the data signal, and control a working state of the driving unit according to the data signal.

5. The control method of the backlight unit as claimed in claim 4, wherein the charging unit is a first thin film transistor, the driving unit is a second thin film transistor, the energy storage unit is a capacitor, and the plurality of light-emitting components connected in series comprise sub-millimeter light-emitting diodes;
    a gate of the first thin film transistor is connected to a scanning line, a first end of the first thin film transistor is connected to a data line, and a second end of the first thin film transistor is connected to a gate of the second thin film transistor;
    one end of the plurality of light-emitting components connected in series is connected to a first level end, and the other end of the plurality of light-emitting components connected in series is connected to a first end of the second thin film transistor; and the gate of the second thin film transistor is connected to the second end of the first thin film transistor and a first end of the capacitor, the first end of the second thin film transistor is connected to the plurality of light-emitting components connected in series, and a second end of the second thin film transistor is connected to a second level end and a second end of the capacitor.

6. The control method of the backlight unit as claimed in claim 1, wherein the step of obtaining the backlight data corresponding to each partition comprises a following step:

obtaining the backlight data of each partition from a timing controller or a field editable array.

7. A backlight unit, wherein the backlight unit comprises a plurality of partitions, each partition comprises a light-emitting unit, and the backlight unit comprises:

an obtaining unit configured to obtain backlight data corresponding to each partition, wherein the backlight data comprises a plurality of bits of data;

a dividing unit configured to divide the light-emitting unit of each partition into a plurality of subfields with different durations in a light-emitting process during a frame, wherein each subfield corresponds to one bit of data, and any two subfields comprise different numbers of secondary subfields; and an output unit configured to output the plurality of subfields in a preset order.

8. The backlight unit as claimed in claim 7, wherein the dividing unit is configured to divide the light-emitting unit of each partition into Nth subfields with different durations in the light-emitting process during one frame, an i-th subfield corresponds to an (i−1)th bit of data, a duration of the i-th subfield is 2i−1 equal-duration, the i-th subfield comprises 2i−1 secondary subfield, a duration of each secondary subfield is equal to the equal-duration, each equal-duration is equal to M/2N, M is a duration of one frame, i is an integer greater than or equal to 1 and less than or equal to N, M is greater than 0, the backlight data comprises the bits of data from a 0th bit to an (N−1)th bit, and N is an integer greater than or equal to 2.

9. The backlight unit as claimed in claim 8, wherein the output unit is configured to output the subfields from a 1st subfield to an Nth subfield in sequence, and output corresponding bit of data once during each secondary subfield of the i-th subfield;

wherein the bits of data from the 0th bit to the (N−1)th bit are 0 or 1, when the (i−1)th bit of data is 1, the light-emitting unit is in a bright state for a duration corresponding to the i-th subfield; and when the (i−1)th bit of data is 0, the light-emitting unit is in a dark state for the duration corresponding to the i-th subfield.

10. The backlight unit as claimed in claim 7, wherein each light-emitting unit comprises a charging unit, a driving unit, an energy storage unit, and a plurality of light-emitting components connected in series;

the charging unit, the driving unit, and the energy storage unit are electrically connected, thereby being configured to write a data signal into the energy storage unit according to a scanning signal;

the driving unit, the energy storage unit, the charging unit, and the plurality of light-emitting components connected in series are electrically connected, thereby being configured to drive the plurality of light-emitting components connected in series to work under control of the energy storage unit; and the energy storage unit is configured to store the data signal, and control a working state of the driving unit according to the data signal.

11. The backlight unit as claimed in claim 10, wherein the charging unit is a first thin film transistor, the driving unit is a second thin film transistor, the energy storage unit is a capacitor, and the plurality of light-emitting components connected in series comprise sub-millimeter light-emitting diodes;

a gate of the first thin film transistor is connected to a scanning line, a first end of the first thin film transistor is connected to a data line, and a second end of the first thin film transistor is connected to a gate of the second thin film transistor;

one end of the plurality of light-emitting components connected in series is connected to a first level end, and the other end of the plurality of light-emitting components connected in series is connected to a first end of the second thin film transistor; and the gate of the second thin film transistor is connected to the second end of the first thin film transistor and a first end of the capacitor, the first end of the second thin film transistor is connected to the plurality of light-emitting components connected in series, and a second end of the second thin film transistor is connected to a second level end and a second end of the capacitor.

12. A liquid crystal display device, wherein the liquid crystal display device comprises a backlight unit, the backlight unit comprises a plurality of partitions, each partition comprises a light-emitting unit, and the backlight unit comprises:

an obtaining unit configured to obtain backlight data corresponding to each partition, wherein the backlight data comprises a plurality of bits of data;

a dividing unit configured to divide the light-emitting unit of each partition into a plurality of subfields with different durations in a light-emitting process during a frame, wherein each subfield corresponds to one bit of data, and any two subfields comprise different numbers of secondary subfields; and an output unit configured to output the plurality of subfields in a preset order.

13. The liquid crystal display device as claimed in claim 12, wherein the dividing unit is configured to divide the light-emitting unit of each partition into Nth subfields with different durations in the light-emitting process during one frame, an i-th subfield corresponds to an (i−1)th bit of data, a duration of the i-th subfield is 2i−1 equal-duration, the i-th subfield comprises 2i−1 secondary subfield, a duration of each secondary subfield is equal to the equal-duration, each equal-duration is equal to M/2N, M is a duration of one frame, i is an integer greater than or equal to 1 and less than or equal to N, M is greater than 0, the backlight data comprises the bits of data from a 0th bit to an (N−1)th bit, and N is an integer greater than or equal to 2.

14. The liquid crystal display device as claimed in claim 13, wherein the output unit is configured to output the subfields from a 1st subfield to an Nth subfield in sequence, and output corresponding bit of data once during each secondary subfield of the i-th subfield;

wherein the bits of data from the 0th bit to the (N−1)th bit are 0 or 1, when the (i−1)th bit of data is 1, the light-emitting unit is in a bright state for a duration corresponding to the i-th subfield; and when the (i−1)th bit of data is 0, the light-emitting unit is in a dark state for the duration corresponding to the i-th subfield.

15. The liquid crystal display device as claimed in claim 12, wherein each light-emitting unit comprises a charging unit, a driving unit, an energy storage unit, and a plurality of light-emitting components connected in series;

the charging unit, the driving unit, and the energy storage unit are electrically connected, thereby being configured to write a data signal into the energy storage unit according to a scanning signal;

the driving unit, the energy storage unit, the charging unit, and the plurality of light-emitting components connected in series are electrically connected, thereby being configured to drive the plurality of light-emitting components connected in series to work under control of the energy storage unit; and the energy storage unit is configured to store the data signal, and control a working state of the driving unit according to the data signal.

16. The liquid crystal display device as claimed in claim 15, wherein the charging unit is a first thin film transistor, the driving unit is a second thin film transistor, the energy storage unit is a capacitor, and the plurality of light-emitting components connected in series comprise sub-millimeter light-emitting diodes;

a gate of the first thin film transistor is connected to a scanning line, a first end of the first thin film transistor is connected to a data line, and a second end of the first thin film transistor is connected to a gate of the second thin film transistor;

one end of the plurality of light-emitting components connected in series is connected to a first level end, and the other end of the plurality of light-emitting components connected in series is connected to a first end of the second thin film transistor; and the gate of the second thin film transistor is connected to the second end of the first thin film transistor and a first end of the capacitor, the first end of the second thin film transistor is connected to the plurality of light-emitting components connected in series, and a second end of the second thin film transistor is connected to a second level end and a second end of the capacitor.

* * * * *